United States Patent
Pinel et al.

(10) Patent No.: US 8,903,923 B2
(45) Date of Patent: Dec. 2, 2014

(54) METHODS AND APPARATUS FOR SYSTEM MONITORING

(75) Inventors: Florian Pinel, New York, NY (US);
Larisa Shwartz, Scarsdale, NY (US);
Liang Tang, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 13/292,178

(22) Filed: Nov. 9, 2011

(65) Prior Publication Data

US 2013/0113616 A1      May 9, 2013

(51) Int. Cl.
*G06F 15/16*          (2006.01)
*G06Q 10/06*          (2012.01)

(52) U.S. Cl.
CPC ................................. *G06Q 10/0631* (2013.01)
USPC ........................................................ 709/206

(58) Field of Classification Search
CPC ..... H04L 41/5074; H04L 12/28; H04L 41/50; G06Q 10/0631
USPC ................................... 709/206; 340/501–505
See application file for complete search history.

(56) References Cited

U.S. PATENT DOCUMENTS

| | | | |
|---|---|---|---|
| 6,651,049 B1 * | 11/2003 | Agrawal et al. ............... | 707/694 |
| 6,697,802 B2 | 2/2004 | Ma et al. ............... | 707/6 |
| 7,392,311 B2 | 6/2008 | Grabarnik et al. ............ | 709/224 |
| 7,469,287 B1 | 12/2008 | Castillo et al. ................ | 709/224 |
| 7,504,936 B2 * | 3/2009 | Miller et al. .................. | 340/506 |
| 2003/0200486 A1 * | 10/2003 | Marwaha ....................... | 714/39 |
| 2004/0181685 A1 | 9/2004 | Marwaha ....................... | 713/201 |
| 2005/0010545 A1 * | 1/2005 | Joseph .............................. | 707/1 |
| 2005/0273593 A1 * | 12/2005 | Seminaro et al. ............. | 713/151 |
| 2005/0278073 A1 * | 12/2005 | Roth .............................. | 700/282 |
| 2006/0221848 A1 | 10/2006 | Lake ............................. | 370/252 |
| 2006/0224542 A1 * | 10/2006 | Yalamanchi .................... | 706/47 |
| 2007/0067175 A1 * | 3/2007 | Fulgham et al. .................. | 705/1 |
| 2009/0210376 A1 | 8/2009 | Lorge .............................. | 706/47 |
| 2011/0320584 A1 * | 12/2011 | Siddam et al. ............... | 709/224 |
| 2013/0095466 A1 * | 4/2013 | Richardson ................... | 434/362 |

OTHER PUBLICATIONS

Authors: Chaochang Chiu and Pei-Lun Hsu. Title: A Constraint-Based Genetic Algorithm Approach for Mining Classification Rules. (IEEE Transactions on Systems, Man, and Cybernetics—Part C: Applications and Reviews, vol. 35, No. 2, May 2005).*

Bayardo Jr., Robert J. et al., "Constraint-Based Rule Mining in Large,Dense Databases", 10 pgs.

Kashyap, Srinivas et al., "Efficient Constraint Monitoring Using Adaptive Thresholds", 10 pgs.

(Continued)

*Primary Examiner* — Vivek Srivastava
*Assistant Examiner* — Karina J Garcia-Ching
(74) *Attorney, Agent, or Firm* — Harrington & Smith; Louis J. Percello

(57) ABSTRACT

Improved systems and techniques for identification and resolution of conditions affecting an information technology system. When an alert is received, it is identified as actionable or non-actionable and, if non-actionable, is subjected to a waiting time before a trouble ticket is created. If the alert has cleared by the time the waiting time expires, an event associated with the alert is discarded and no trouble ticket is created. Non-actionable alerts are identified using a system of predictive rules, with rules being generated according to appropriate criteria, such as the likelihood that an event identified by a rule will be non-actionable, and by the likelihood that an event will be identified by a rule.

18 Claims, 8 Drawing Sheets

(56) References Cited

OTHER PUBLICATIONS

Kim, Sankyum, et al., "Polygraph: System for Dynamic Reduction of False Alerts in Large-Scale IT Service Delivery Environments", 6 pgs.

Lambert, Diane, et al., "Adaptive Thresholds: Monitoring Streams of Network Counts", Journal of the American Statistical Association, vol. 101, No. 473, Mar. 2006, 11 pgs.

Ma, Sheng, et al., "Progressive and Interactive Analysis of Event Data Using Event Miner", IEEE 2002, pp. 661-664.

Perng, Chang-Shing, et al., "Data-driven Validation, Completion and Construction of Event Relationship Networks", SIGKDD'03, Aug. 2003, pp. 729-734.

Srikant, Ramakrishnan, et al., "Mining Quantitative Association Rules in Large Relational Tables", 12 pgs.

Yin, Xiaoxin, et al., "CPAR: Classification based on Predictive Associate Rules", 5 pgs.

\* cited by examiner

400

```
┌─────────────────────────┐
│ Collect data relating to│
│   recent tickets and    │
│        events           │
│          402            │
└───────────┬─────────────┘
            ▼
┌─────────────────────────┐
│ Preprocess raw data     │
│ relating to tickets and │
│        events           │
│          404            │
└───────────┬─────────────┘
            ▼
┌─────────────────────────┐
│ Generate predictive     │
│ rules for identifying   │
│  non-actionable alerts  │
│          406            │
└───────────┬─────────────┘
            ▼
┌─────────────────────────┐
│ Determine a waiting time│
│ associated with each    │
│         rule            │
│          408            │
└───────────┬─────────────┘
            ▼
┌─────────────────────────┐
│ Distribute rules and    │
│ associated waiting times│
│        for use          │
│          410            │
└───────────┬─────────────┘
            ▼
┌─────────────────────────┐
│ Examine number of       │
│ eliminated non-actionable│
│ tickets and delay       │
│ imposed on actionable   │
│ tickets                 │
│          412            │
└───────────┬─────────────┘
            ▼
┌─────────────────────────┐
│ Make adjustments to     │
│ rules and waiting times │
│          414            │
└─────────────────────────┘
```

FIG. 4

METHODS AND APPARATUS FOR SYSTEM MONITORING

FIELD OF THE INVENTION

The present invention relates generally to information services. More particularly, the invention relates to systems and techniques for avoiding false identification of malfunctions in systems providing information services.

BACKGROUND

Information technology (IT) systems are a vital part of everyday life. IT systems typically fill a vital role in the functioning of an enterprise. Failure of a system is frequently unacceptable, and slowdowns or inefficiencies in portions of a system can have a significant negative impact on the enterprise. Users of IT systems and customers of IT service providers demand high levels of reliability together with economical delivery of service. Services vendors and providers are therefore motivated to use highly efficient and cost-effective mechanisms for preventing, detecting, and resolving problems. One mechanism used to help insure efficiency and cost-effectiveness of problem resolution is the automation, insofar as is possible, of problem detection and resolution. A frequently used mechanism for automated problem detection is to detect degradation of vital signs and respond by creating a trouble ticket. However, it is known that degradation of vital signs may be transitory, so that no action needs to be taken in response. Creation of a trouble ticket for a condition for which no action needs to be taken risks the waste of resources that could be better applied.

BRIEF SUMMARY

In one embodiment of the invention, a method comprises configuring at least one processor to perform functions comprising receiving data identifying an event alert associated with a condition affecting an information technology system, and determining whether the alert is actionable or non-actionable. If the alert is determined to be non-actionable, a waiting time is imposed on the event requiring that the waiting time elapse before a trouble ticket is created for the event.

In another embodiment of the invention, an apparatus comprises at least one processor, and memory storing a program of instructions. The memory and the program of instructions are configured to, with the processor, configure an apparatus to perform functions comprising receiving data identifying an event alert associated with a condition affecting an information technology system and determining whether the alert is actionable or non-actionable. If the alert is determined to be non-actionable, a waiting time is imposed on the event requiring that the waiting time elapse before a trouble ticket is created for the event.

In another embodiment of the invention, a non-transitory computer readable medium stores a program of instructions. Execution of the program of instructions by a processor configures an apparatus to perform functions comprising receiving data identifying an event alert associated with a condition affecting an information technology system and determining whether the alert is actionable or non-actionable. If the alert is determined to be non-actionable, a waiting time is imposed on the event requiring that the waiting time elapse before a trouble ticket is created for the event.

BRIEF DESCRIPTION OF THE SEVERAL VIEWS OF THE DRAWINGS

FIG. 4 illustrates a process of rule creation according to an embodiment of the present invention;

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
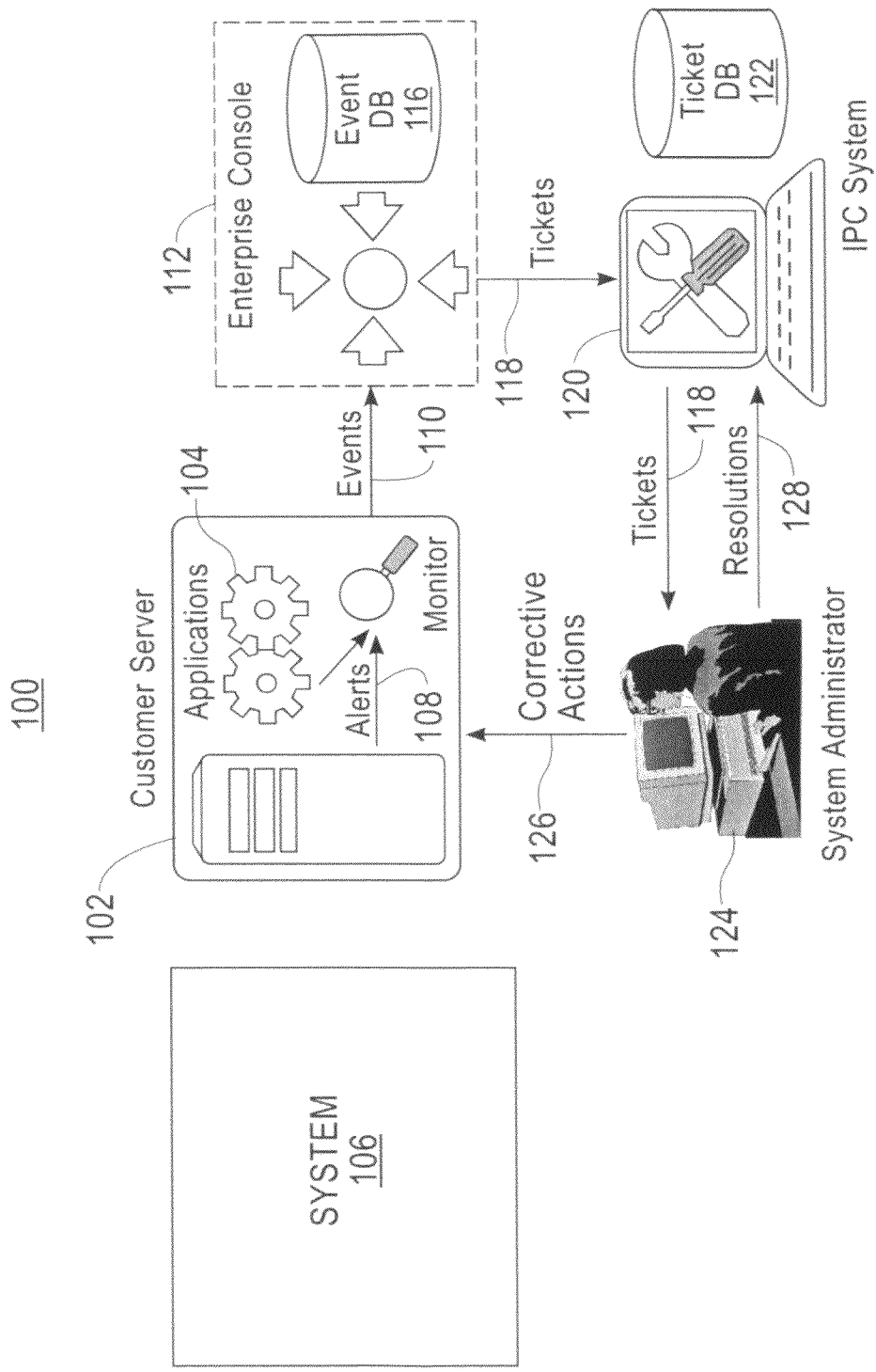
FIG. 1 illustrates a diagram showing a problem detection and resolution system according to an embodiment of the present invention and information flow within the system.

FIG. 1 is a diagram 100 illustrating workflow in detecting and resolving IT problems. In the example presented here, monitoring takes place at a customer server 102, as monitoring software 104 hosted by server 102 computes metrics for the hardware and software performance of a system 106 receiving services from the server 102. The metrics are then compared to acceptable thresholds, which are often referred to as situation definitions, with any violation of a threshold that is associated with a situation definition causing the raising of an alert such as the alert 108. If the alert 108 persists beyond a delay specified in the situation definition, the monitoring software 104 generates an event such as the event 110. In the example discussed here, a single server 102 provides monitoring services for the entire system 106, but it will be recognized that any number of servers may be employed, and it will also be recognized that operations described here as performed by the server 102 may be distributed across multiple servers depending on design choices. In the present example, events generated by the server 102 based on observations of the entire system 106 are consolidated in the enterprise console 112, which may comprise an event database 116. The console 112 may use rule-based, case-based, or knowledge-based engines to analyze the monitoring events and determine whether to open a service ticket 118 in an incident, problem, change (IPC) system 120. The IPC system 120 may suitably comprise a ticket tracking database 122, for storage of open and closed tickets. The console 112, event database 116, IPC system 120, and ticket tracking database 122 are illustrated here separately for clarity of illustration, but it will be recognized that the various elements and functions may be implemented separately or together in any desired configuration of hardware, software, and data storage. The service ticket 118 compiles information relating to the event 110 and presents the information in a standardized form for use by a system administrator 124. The system administrator 124 may suitably take corrective actions 126, and may enter resolutions 128 into the IPC system, suitably by making an appropriate entry in tickets such as the ticket 118 and closing the ticket 118. The number and complexity of open service tickets such as the service ticket 118 represents the workload for the system administrator 124.

The resolution of a service ticket by a human system administrator such as the administrator 124 represents a significant cost. The present invention recognizes that the creation of trouble tickets for transitory occurrences where no intervention is actually needed presents significant labor costs, even if the system administrator simply closes the ticket after examining it.

Embodiments of the present invention further recognize that performing a detailed analysis of an IT system in order to set up situation definitions can require enormous resources, particularly in the case of a large, distributed system. System administrators therefore frequently rely on default situation definitions. In addition, IT system usage is likely to change over time. The use of default situation definitions that are not specifically adapted to a system, or the continued use of default situations that may be out of date due to changes in the system, may read to the creation of a large number of non-actionable alerts. Alerts may suitably be defined as follows:

| | |
|---|---|
| Non-Actionable Alert | An alert for which the system administrator does not need to take any action |
| Real Alert | An alert that requires the system administrator to take actions to fix the corresponding problem on the server |
| Alert Duration | The length of time from an alert creation to its clearing |
| Transient Alert | An alert that is automatically cleared before the technician opens its corresponding ticket |
| Event | The notification of an alert to the Enterprise Console |
| Non-Actionable Ticket | A ticket created from a non-actionable alert |
| Real Ticket | A ticket created from a real alert |

When the system administrator 118 resolves a ticket, he or she may include a resolution message in the ticket tracking database 122. It is not unusual to find entire categories of alerts that are entirely non-actionable, such as CPU or paging utilization alerts. Examination of the resolution messages may provide a simple explanation for each alert, such as the CPU utilization spikes occurring at regular intervals due to the operation of anti-virus programs, or the opening of databases that reserve large amounts of disk space in advance Embodiments of the present invention recognize that standardization of IT services and infrastructures for enterprise customers is limited, and that enterprise customers, particularly larger customers, generally require specific design and operation of the system, fitted to the customer's particular needs. This requirement creates great variability in the services that must be provided by IT support organizations. If human operators or administrators can pay attention to specific situations, it may be a simple matter to refine thresholds for particular metrics. However, in large systems, there are rarely enough human operators to analyze and correct system monitoring, so embodiments of the present invention provide for systems and techniques to automatically analyze monitoring operations and results and develop rules to minimize the generation of tickets for non-actionable alerts without causing excessive delay in response to real alerts.

Figure 2:
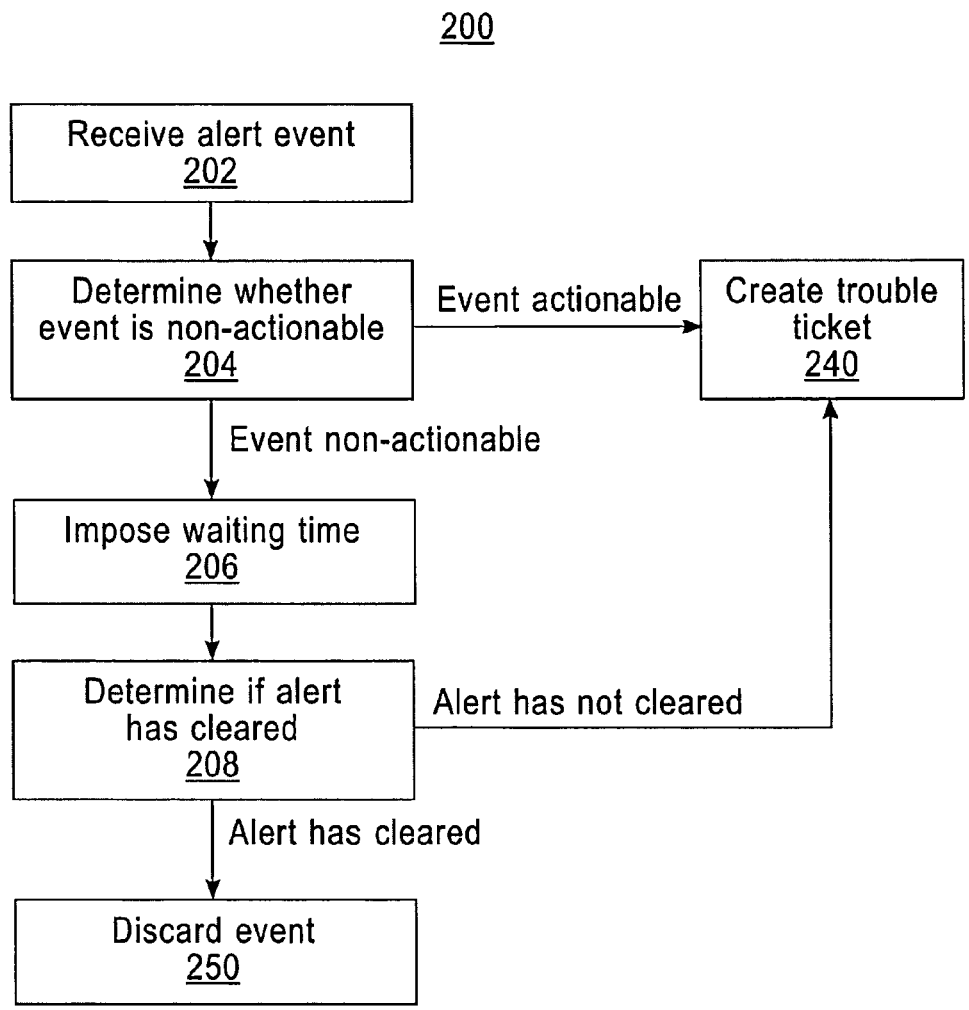
FIG. 2 illustrates a process of alert analysis according to an embodiment of the present invention.

FIG. 2 illustrates the steps of a process 200 of alert analysis according to an embodiment of the present invention. The process 200 may suitably be used to manage events received by the enterprise console 112. At step 202 an event alert is received. At step 204, a determination is made as to whether the alert is non-actionable. If the alert is actionable, the process proceeds to step 240 and a ticket is created. If the alert is non-actionable, the process proceeds to step 206 and a waiting time is imposed. After the waiting time has elapsed, at step 210, a determination is made as to whether the alert has cleared. If the alert has not cleared, the process proceeds to step 240 and a ticket is created. If the process has cleared, the process proceeds to step 250 and the event is discarded.

Figure 3:
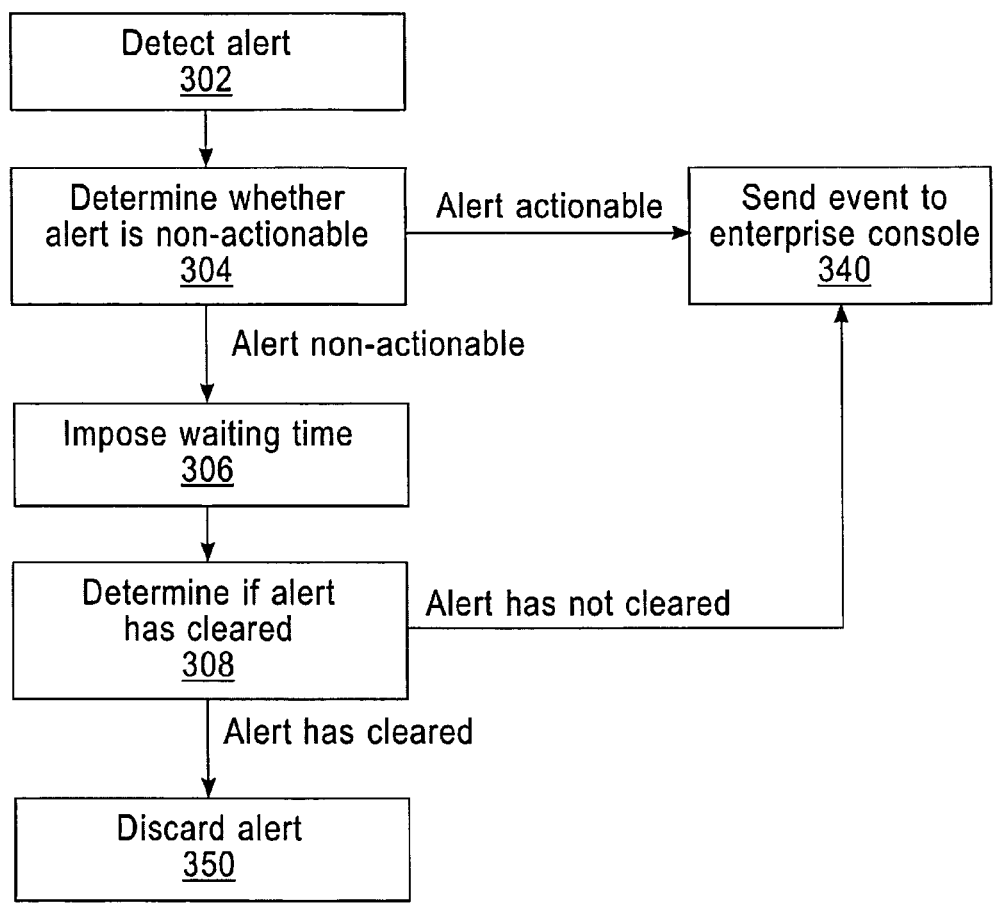
FIG. 3 illustrates a process of alert analysis according to an embodiment of the present invention.
Figure 5:
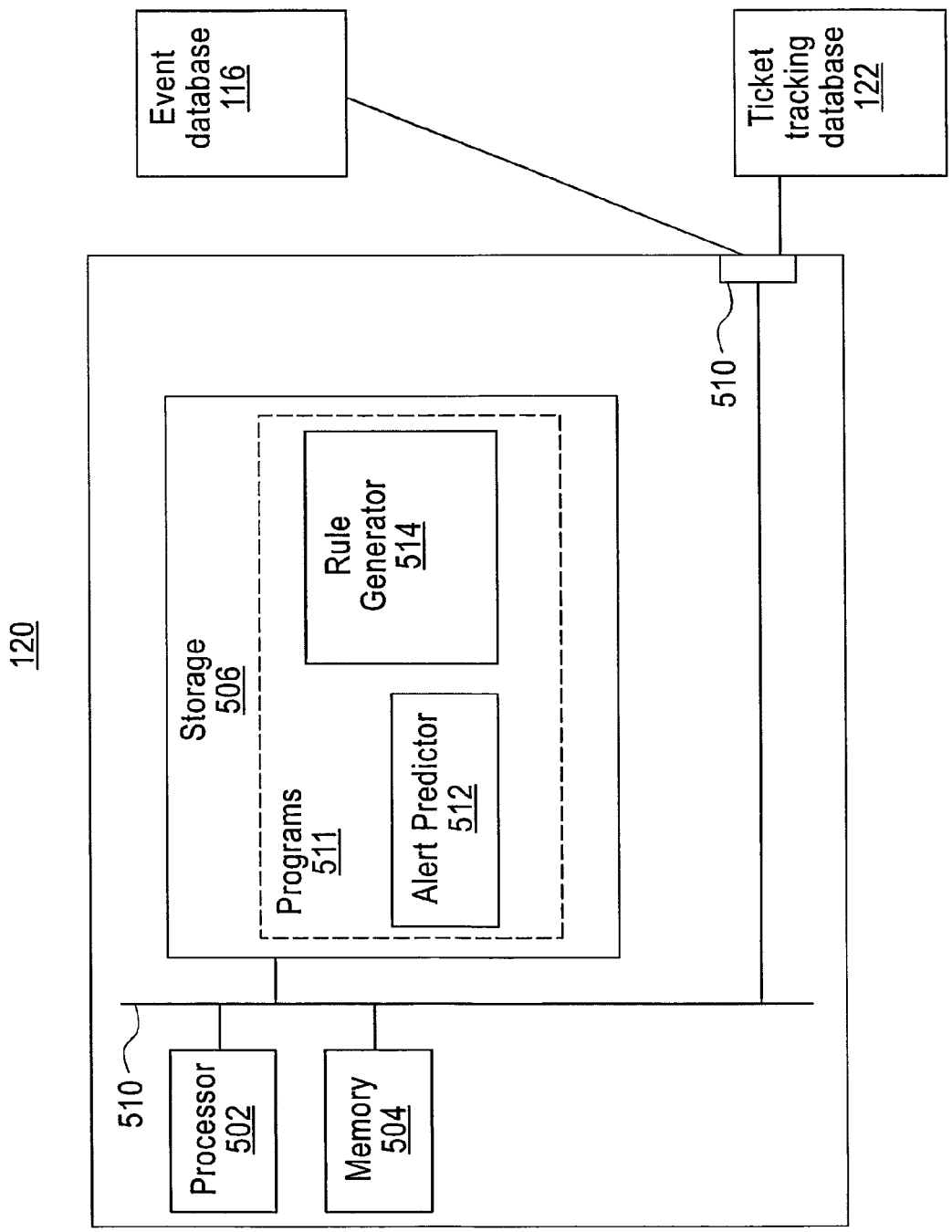
FIG. 5 illustrates additional details of a system according to an embodiment of the present invention.
Figure 6:
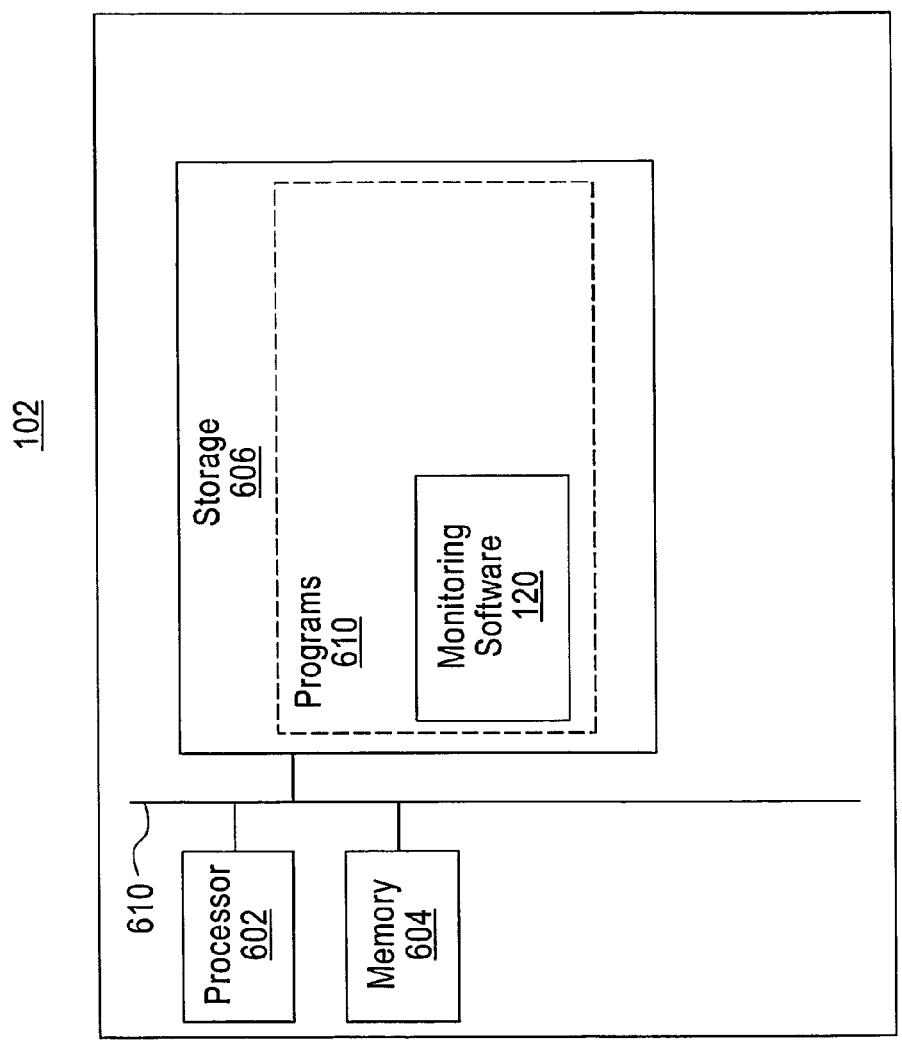
FIG. 6 illustrates details of a customer server that may be used in an embodiment of the present invention.

FIG. 3 illustrates the steps of a process 300 of alert analysis according to an embodiment of the present invention that may be used as an alternative or in addition to the process 200 of FIG. 2. The process 300 may suitably be used, for example to manage alerts received at monitoring software residing on a customer server, such as the monitoring software 104 of the server 102 of FIG. 1. The process 300 manages alerts before they become events, in order to avoid creating unnecessary events that then must be resolved, one way or another, by the enterprise console.

At step 302 an alert is received. At step 304, a determination is made as to whether the alert is non-actionable. If the alert is actionable, the process proceeds to step 240 and an event and sent to the enterprise console. If the alert is non-actionable, the process proceeds to step 306 and a waiting time is imposed. After the waiting time has elapsed, at step 310, a determination is made as to whether the alert has cleared. If the alert has not cleared, the process proceeds to step 240 and an event is sent to the enterprise console. If the process has cleared, the process proceeds to step 350 and the event is discarded.

Embodiments of the invention provide mechanisms for determining whether an alert is actionable or non-actionable and for determining the waiting time to be imposed if an event is identified as non-actionable. In order to make these determinations, embodiments of the present invention provide for a process 400 of data collection and analysis. At step 402, data relating to recent tickets and events is collected. At step 404, raw data relating to the tickets and events is preprocessed. At step 406, predictive rules for identifying non-actionable alerts are generated. At step 408, a waiting time associated with each rule is determined. At step 410, the rules and associated waiting times are distributed for use. At step 412, the number of eliminated non-actionable tickets and the delay time imposed on actionable tickets may be examined, and the rules and delay times adjusted at step 414. The process 400 may be performed as desired. For example, it may be performed periodically according to a schedule, or may be performed when actually activated by an administrator.

FIG. 500 illustrates additional details of the IPC system 120. The system 120 may comprise a processor 502, memory 504, storage 506, and external interface 508, suitably communicating over a bus 510. The system 120 may suitably have access to the event database 116 and the ticket tracking database 122. The IPC system may employ one or more programs of instructions 511, of which one may be an alert predictor 512, suitably implemented as software residing in storage 406 and transferred to memory 504 as needed for execution by the processor 502. The alert predictor 512 suitably assigns a label to each alert, "non-actionable" or "real." The alert predictor 512 employs a set of predictive rules that may be automatically generated by a rule generator 514, which may be another of the programs of instructions 511, also suitably implemented as software residing in storage 506.

FIG. 600 illustrates additional details of the customer server 102, which may suitably implement the monitoring software 104 discussed above in connection with FIG. 1. The server 102 may comprise a processor 602, memory 604, storage 606, and external interface 608, suitably communicating over a bus 610. The server 102 may employ one or more programs of instructions 610, of which one the monitoring software 108, suitably implemented as software residing in storage 606 and transferred to memory 604 as needed for execution by the processor 602.

In various embodiments of the invention, a predictive rule comprises a rule condition and an alert label. A rule condition is a conjunction of literals, wherein each literal comprises an event attribute, a relational operator, and a constant value. For example, suppose a specified level of CPU consumption by a single process generates an alert. A rule may be created to indicate that this alert, if generated by particular processes, is non-actionable. For example, a rule may be formulated as follows:

If PROC_CPU_TIME>50% and "PROC_NAME"=Rtvscan, THEN, this alert is non-actionable.

"PROC_CPU_TIME" and "PROC_NAME" are literals and "50%" and "rtvscan" are constant values. Conveniently, predictive rules may identify only non-actionable alerts, because declining to identify an alert as non-actionable may be considered the same as identifying the alert as actionable.

The rule generator 514 may suitably create all literals by scanning historical events. It may them apply a breadth-first search to enumerate all literals in finding predictive rules.

Predictive rules are those rules having predictive power. The rule generator 514 may suitably employ two criteria to quantify the minimum predictive power: a minimum confidence mincon f and a minimum support minsup. For example, the criterion for mincon f may be that for each predictive rule found, the value of mincon f must be 0.9, that is, at least 90% of the covered historical alerts are non-actionable. The criterion for minsup f may be that at least 10% of historical alerts are covered by the rule. To achieve the best possible performance, the rule generator 514 may loop through values for mincon f and minsup and compute performance for each pair of values.

Typically, agreements between IT service providers and their customers provide that each real ticket must be acknowledged and resolved within a maximum acceptable time. Therefore, the rule generator 514 takes into account the maximum allowed time for postponing resolution of a ticket. In addition, for each monitoring system, the rule generator 514 takes into account the maximum ratio of real tickets that can be postponed. This maximum ratio is primarily determined by the severity of the situation. Therefore, two user-oriented parameters may be employed:

$ratio_{delay}$, which is the maximum ratio of real alerts that can be delayed, which is defined as falling within a range of $0 \leq ratio_{delay} \leq 1$.

$delay_{max}$, which is the maximum allowed delay time for any real alert, falling within the range of $delay_{max}$.

The specific values of $ratio_{delay}$ and $delay_{max}$ may suitably be specified by system administrators as inputs to or stored values used by the rule generator 514. The specific values may be determined based on the severity of the monitoring situation and a service level agreement with a customer.

The rule generator 514 may suitably select only rules exhibiting strong predictive power. In one example, Laplace accuracy is used for estimating the predictive power of a rule. Laplace accuracy may be defined as follows:

$$LaplaceAccuracy(c_i, D) = \frac{N(c_i) + 1}{N_{nor.} + 2},$$

where D is the set of alert events, $c_i$ is a predictive rule, $N(c_i)$ is the number of events in D satisfying rule $c_i$ and $N_{non}$ is the number of non-actionable events in D.

Figure 7:
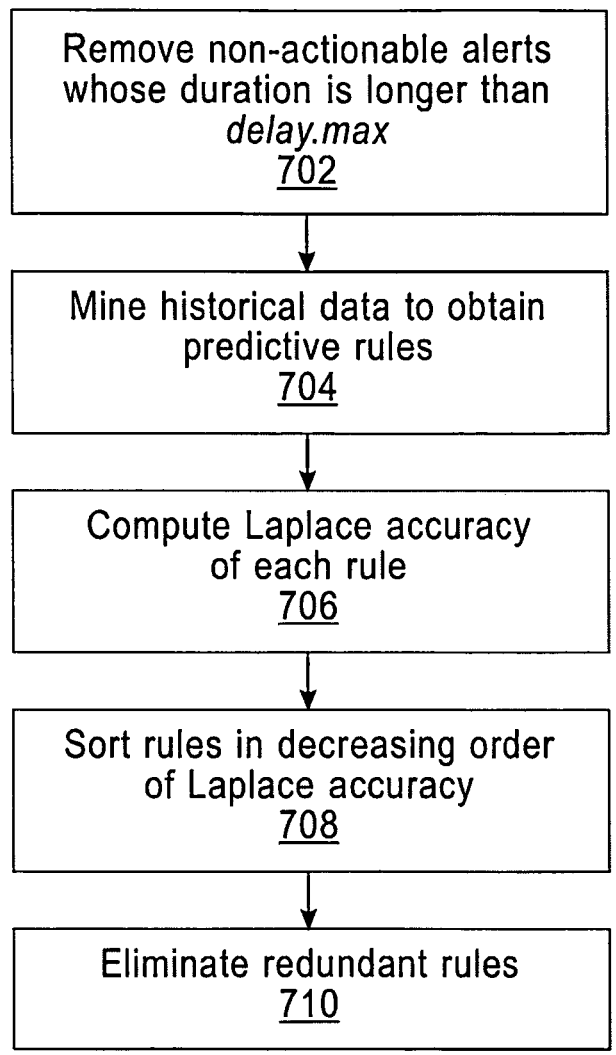
FIG. 7 illustrates a process of predictive rule generation according to an embodiment of the present invention.

FIG. 7 illustrates a process 700 for generating non-actionable alert predictive rules. For an alert event e, e.label denotes the label and e.duration denotes the duration. At step 702, the non-actionable alerts whose duration is longer than $delay_{max}$ are removed because they may not be transient. At step 704, historical data are mined to obtain predictive rules from the historical data stored in the event database 116 and the ticket tracking database 122. At step 706, the Laplace Accuracy of each rule is computed for all predictive rules. At step 708, the rules are sorted in decreasing order of Laplace accuracy. At step 710, redundant rules are eliminated. Elimination of redundant rules may be performed by identifying a rule such that an alert satisfying the rule must satisfy a previous rule. Because the rules are ranked in descending order of Laplace accuracy, a subsequent rule that is redundant to a previous rule may be eliminated because the previous rule will have a higher Laplace accuracy. For example, consider the following two criteria:

PROC_CPU_TIME>50% AND PROC_NAME="Rtvscan" and PROC_CPU_TIME>60% AND PROC_NAME="Rtvscan". If an alert satisfies the first rule, it must satisfy the second. Therefore, even if both rules have high Laplace accuracies, only one is needed.

The rule-based predictor provided by embodiments of the present invention carries significant benefits. One benefit is simplicity of implementation. Each monitoring situations is equivalent to a quantitative association rule, so that the rules generated by the rule generator 514, for example, can be expected to be easily built from and adapted to existing monitoring situations. In addition, the simplicity of the rules makes them easy for users to verify. For example, as noted above, alerts indicating high CPU utilization due to the process "Rtvscan" can be easily investigated by users, because they can identify the "Rtvscan" as associated with NORTON anti-virus software.

As noted above, the process 400 computes a waiting time at step 408. A waiting time is the duration by which a ticket should be postponed if its corresponding alert is classified as non-actionable. A specific delay time is not unique for one monitoring situation. Because an alert can be covered by different predictive rules, each rule may be associated with its own specific delay. For example, CPU utilization alerts can result from different processes, so each rule related to a CPU utilization alert may have its own independently determined waiting time, in order to differentiate between the different circumstances affecting alerts resulting from different processes. In order to remove as many non-actionable alerts as possible, the waiting time may be set as the longest duration of the transient alerts covered by it. For a selected predictive rule p, the waiting time is:

$$wait_p = \max_{e \in f_p} e \cdot duration$$

where $$f_p = \{e | e \in F, \text{is Covered}(p, e) = \text{'true'}\}$$

and F is the set of transient events. For any rule $p \in P$, $wait_p$ must be less than or equal to $delay_{max}$. Therefore, no ticket can be postponed for more than $delay_{max}$.

In another alternative, a waiting time may be based on a user selection. For example, a user may be presented with a distribution of alert durations and may choose an optimal waiting time based on this distribution. For example, a particular waiting time may be associated with a specific condition or set of conditions, and a user may set a waiting time so as to include this condition.

Figure 8A:
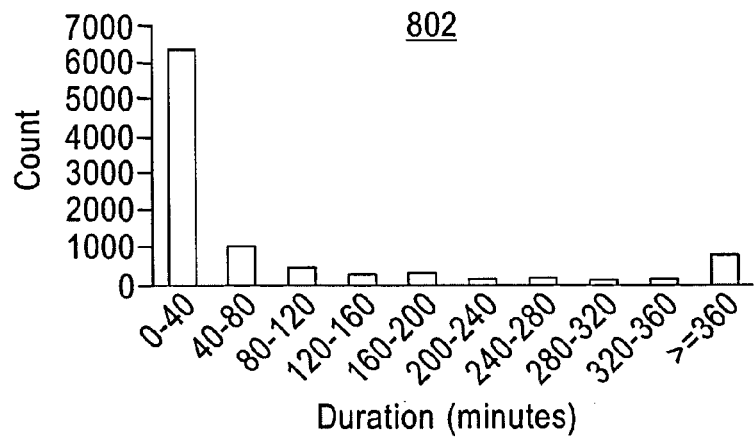
FIGS. 8A-8C illustrate results of monitoring and problem resolution operations according to embodiments of the present invention.
Figure 8B:
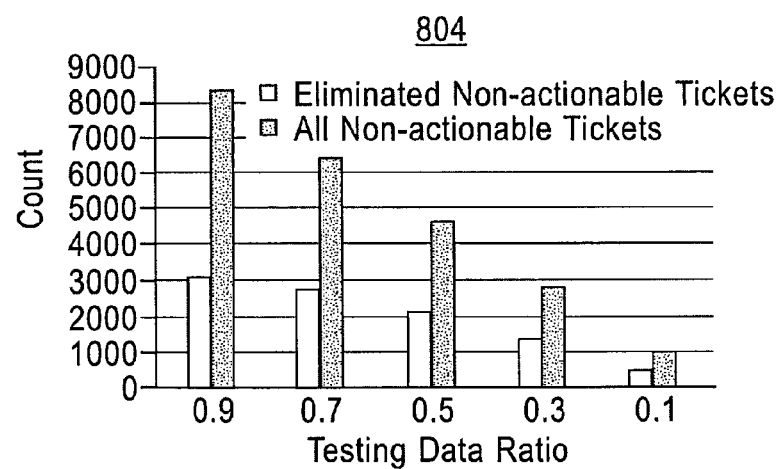
Figure 8C:
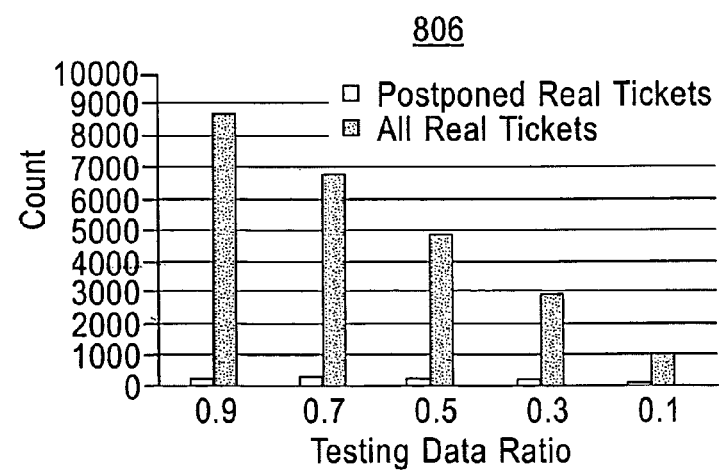

FIGS. 8A-8C illustrate graphs 802-806 presenting testing results for a monitoring and problem resolution operation according to an embodiment of the present invention, showing the distribution of the overall non-actionable alert duration for a set of test data collected from a customer system. Testing was performed using an IBM Tivoli monitoring system, with alert and ticket data collected from production servers of the system, over a period of 3 months, summarized in the table below. The data set covers a period of 3 months. |D| is the number of events that generated tickets in the ticketing systems. $N_{non}$ is the number of events in all ticketed events, # Situations is the number of monitoring situations. # Nodes is the number of monitored servers.

| |D| | $N_{non}$ | # Attributes | # Situations | # Nodes |
|---|---|---|---|---|
| 18,974 | 50,377 | 1,082 | 320 | 1,212 |

There are two performance measures:
FPp: The number of non-actionable tickets eliminated
FDp: The number of real tickets postponed Each data set was split into a training portion and a testing portion. "Testing Data Ratio" is the fraction of the testing part in the data set, and the remainder is the training portion. For example, "Testing Data Ratio"=0.9 means that 90% of the data is used for testing and 10% is used for training. All FPp and FDp are only evaluated for the training portion.

The value of $delay_{max}$ was set to 360 minutes and the value of $ratio_{delay}$ was set to 0.25 for all monitoring situations. FIG. 8A shows the number of events subject to various delay durations, FIG. 8B shows the number of eliminated non-actionable tickets and the number of all real tickets for various testing data ratios, and FIG. 8C shows the number of postponed real tickets and the number of all real tickets for various testing data ratios.

The following table presents results of a data sample with a testing data ratio of 0.7, illustrating the characteristics of various rules that may be employed to identify non-actionable events according to various embodiments of the present invention. The first rule deals with a high CPU utilization of the conhost process, which is a normal Windows operation. Windows system administrators usually execute scripts in console windows, causing frequent CPU alerts, most of which are non-actionable. Once script execution is over, the alerts are automatically cleared.

| Situation | Rule Condition | $wait_p$ | $FP_p$ | $FD_p$ |
|---|---|---|---|---|
| prccpu_3ntw_std5 | CPU_Utilization_Proc = conhost | 120 min | 96 | 6 |
| dcss_33zc_stdv3 | NODE = nimwpdc01 | 120 min | 172 | 0 |
| dcss_33zc_stdv3 | NODE-ride0001 | 15 min | 115 | 3 |
| svc_3ntc_INTEL01 | Service_Name = SymantecAntiVirus | 305 min | 428 | 2 |
| dsp_3ntc_stdv2 | Disk_Name = H: | 213 min | 17 | 6 |

The following table presents results of a data sample with a testing data ratio of 0.3, illustrating the characteristics of various rules that may be employed to identify non-actionable events according to various embodiments of the present invention. Here, the first rule deals with the overall CPU utilization. It is noteworthy that almost all of these alerts are non-actionable, so the rule for this situation is N/A, meaning there is no condition branch for the situation. After waiting 355 minutes, most alerts will disappear by themselves.

The last two rules address filespace utilization. The folder/logs is a folder in which to store temporary files created by an application, which will be deleted automatically by the same application. Therefore, even if the used space of this folder is high, it is unlikely to lead to an overflow if the number of used inodes is less than or equal to 16.

| Situation | Rule Condition | $wait_p$ | $FP_p$ | $FD_p$ |
|---|---|---|---|---|
| cpu_xuxw_std | N/A | 355 min | 7093 | 5 |
| monlog_3ntw_std | current_size_64 ≥ AND record_count ≥ 7.37161 | 80 min | 23 | 0 |
| svc_3ntw_vsa_std | binary_path = R:\IBMTEMP\VSA\VSASvc_Cli.exs | 30 min | 27 | 0 |
| fss_xuxw_std | inodes_used ≤ 1616 AND mount_point_u = /logs | 285 min | 12 | 2 |
| fss_xuxw_std | inodes_used ≤ 1616 AND sub_origin = /logs | 285 min | 12 | 2 |

Advantages of the Invention

Various embodiments of the present invention improve over the prior art by providing a rule-based system to identify non-actionable alerts and to impose a waiting time on such alerts. If an alert clears during the waiting time, no trouble ticket is created and the time and expense of responding to the trouble ticket is saved. Predictive rules are created based on historical data. The use of a rule-based system simplifies both adaptation to existing monitoring situations, and verification by customers.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

We claim:

1. A method comprising:
configuring at least one processor to perform functions comprising:
receiving data associated with an event alert associated with a condition affecting an information technology system;
determining whether the event alert is actionable or non-actionable, wherein the determination of whether the event alert is actionable or non-actionable is based on one or more predictive rules; and
in response to determination that the event alert is non-actionable, imposing a first specified waiting time on the event alert and requiring that the first specified waiting time on the event alert elapse before further action is taken for the event alert;
wherein a second specified waiting time is associated with each of the one or more predictive rules, and wherein the second specified waiting time associated with each of the one or more predictive rules is either the longest duration of one or more transient event alerts identified by the rule, or is determined at least in part by taking into account the distribution of one or more transient event alerts identified by the rule.

2. The method of claim 1, further comprising:
after the first specified waiting time on the event alert has elapsed, determining if the event alert has cleared; and
if the event alert has cleared, determining that no action is to be taken in response to the event alert and discarding the event alert.

3. The method of claim 1, wherein each of the one or more predictive rules is created based on one or more criteria, wherein the one or more criteria include a confidence level that an event alert identified by the at least one of the one or more predictive rules will be non-actionable.

4. The method of claim 1, wherein each of the one or more predictive rules is selected based on one or more criteria, wherein the one or more criteria include a confidence level that an event alert will be identified by at least one of the one or more predictive rules.

5. The method of claim 1, wherein each of the one or more predictive rules is selected based on one or more criteria, wherein the one or more criteria include a confidence level that a response to an actionable event alert will be delayed by at least one of the one or more predictive rules.

6. The method of claim 1, wherein each of the one or more predictive rules is selected based on one or more criteria, wherein the one or more criteria include the predictive power of each of the one or more predictive rules.

7. The method of claim 6, wherein the predictive power of each of the one or more predictive rules is determined based on the Laplace accuracy of the rule.

8. The method of claim 1, wherein each of the one or more predictive rules is part of a set, and wherein creating a set of predictive rules comprises:
collecting data relating to trouble tickets and event alerts;
generating the one or more predictive rules for identifying non-actionable event alerts; and
associating a second specified waiting time with each the one or more predictive rules.

9. The method of claim 8, further comprising eliminating non-actionable event alerts having a duration longer than a specified acceptable delay time.

10. The method of claim 8, wherein generating the one or more predictive rules comprises computing the Laplace accuracy for all the one or more predictive rules.

11. The method of claim 8, wherein creating the set of predictive rules comprises ranking each of the one or more predictive rules in order of Laplace accuracy.

12. The method of claim 11, wherein creating the set of predictive rules comprises removing redundant rules.

13. The method of claim 1, wherein the functions further comprise, if the event alert is determined to be actionable, or if the event alert has not cleared when the first specified waiting time on the event alert has elapsed, creating a trouble ticket for the event alert.

14. The method of claim 1, wherein the functions further comprise, if the event alert is determined to be actionable, or if the event alert has not cleared when the first specified waiting time on the event alert has elapsed, sending an event alert to an enterprise console.

15. An apparatus comprising:
at least one processor:
memory storing a program of instructions:
wherein the memory and the program of instructions are configured to, with the processor, configure an apparatus to perform functions comprising:

receiving data identifying an event alert associated with a condition affecting an information technology system;

determining whether the event alert is actionable or non-actionable, wherein the determination of whether the event alert is actionable or non-actionable is based on one or more predictive rules; and in response to determination that the event alert is non-actionable, imposing a first specified waiting time on the event alert and requiring that the first specified waiting time on the event alert elapse before a trouble ticket is created for the event alert;

wherein a second specified waiting time is associated with each of the one or more predictive rules, and wherein the second specified waiting time associated with each of the one or more predictive rules is either the longest duration of one or more transient event alerts identified by the rule, or is determined at least in part by taking into account the distribution of one or more transient event alerts identified by the rule.

16. The apparatus of claim 15, further comprising:

after the first specified waiting time on the event alert has elapsed, determining if the event alert has cleared; and if the event alert has cleared, discarding the event alert.

17. A non-transitory computer readable medium storing a program of instructions, execution of which by a processor configures an apparatus to perform functions comprising:

receiving data identifying an event alert associated with a condition affecting an information technology system;

determining whether the event alert is actionable or non-actionable, wherein the determination of whether the event alert is actionable or non-actionable is based on one or more predictive rules; and in response to determination that the event alert is non-actionable, imposing a first specified waiting time on the event alert and requiring that the first specified waiting time on the event alert elapse before a trouble ticket is created for the event alert, wherein a second specified waiting time is associated with each of the one or more predictive rules, and wherein the second specified waiting time associated with each of the one or more predictive rules is either the longest duration of one or more transient event alerts identified by the rule, or is determined at least in part by taking into account the distribution of one or more transient event alerts identified by the rule.

18. The computer readable medium of claim 17, further comprising:

after the first specified waiting time on the event alert has elapsed, determining if the event alert has cleared; and if the event alert has cleared, discarding the event alert.

* * * * *